Nov. 25, 1930.  G. A. BOUVIER  1,782,403
METHOD OF AND APPARATUS FOR TESTING ELECTRICAL CONDUCTORS
Original Filed Nov. 21, 1925   2 Sheets-Sheet 1
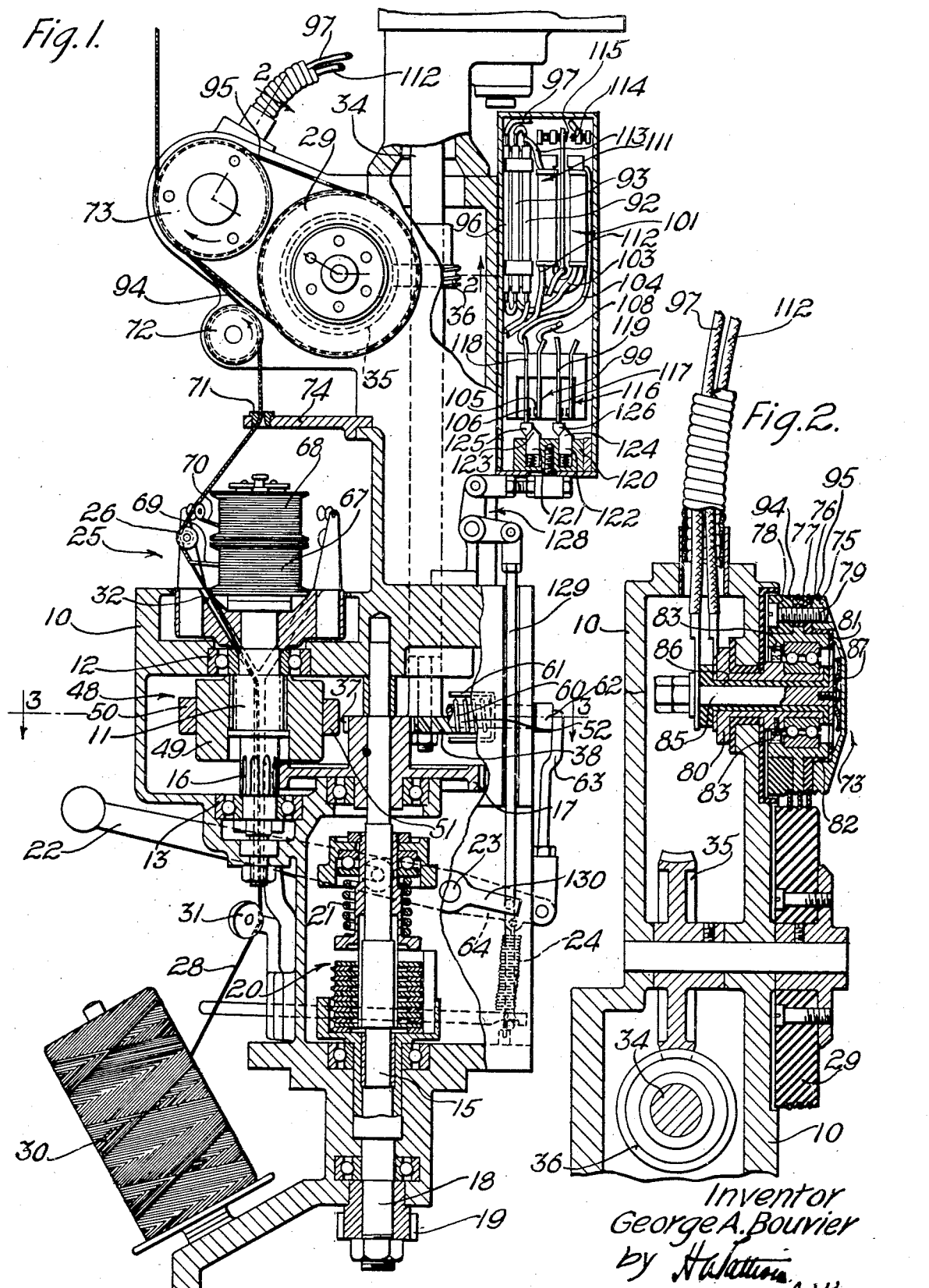

Nov. 25, 1930.  G. A. BOUVIER  1,782,403
METHOD OF AND APPARATUS FOR TESTING ELECTRICAL CONDUCTORS
Original Filed Nov. 21, 1925  2 Sheets-Sheet 2
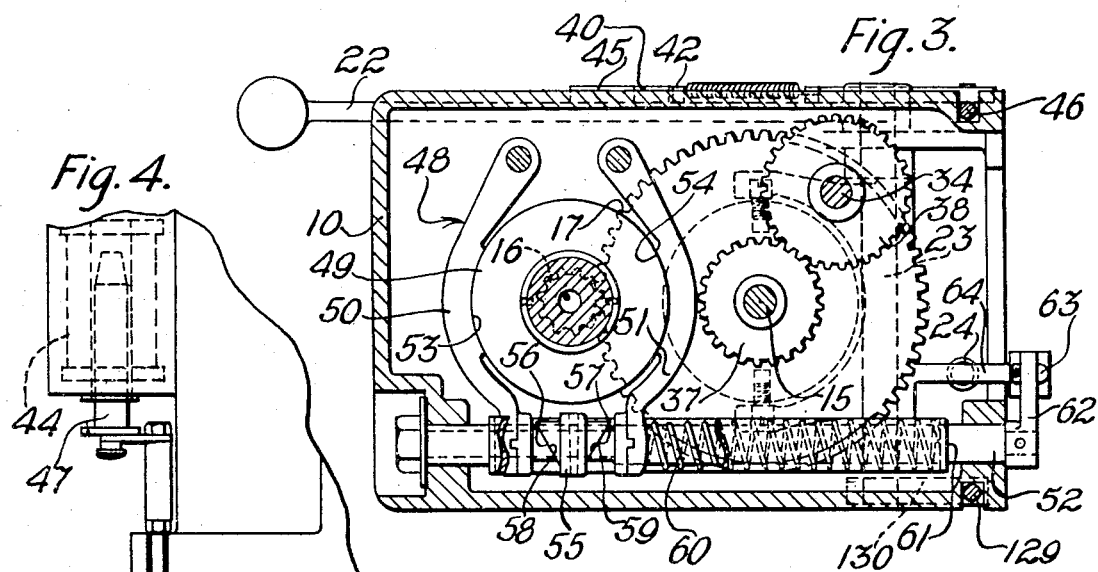
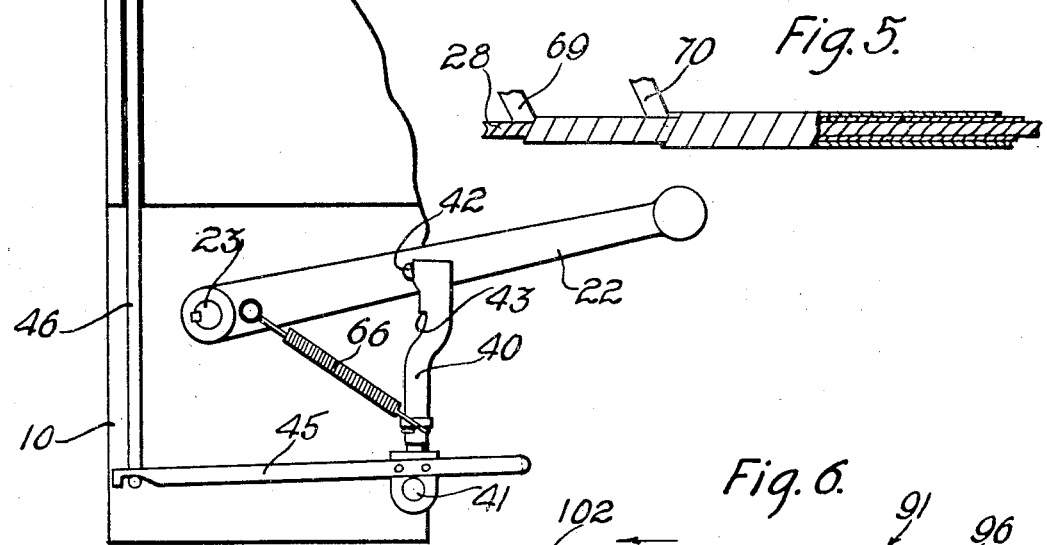
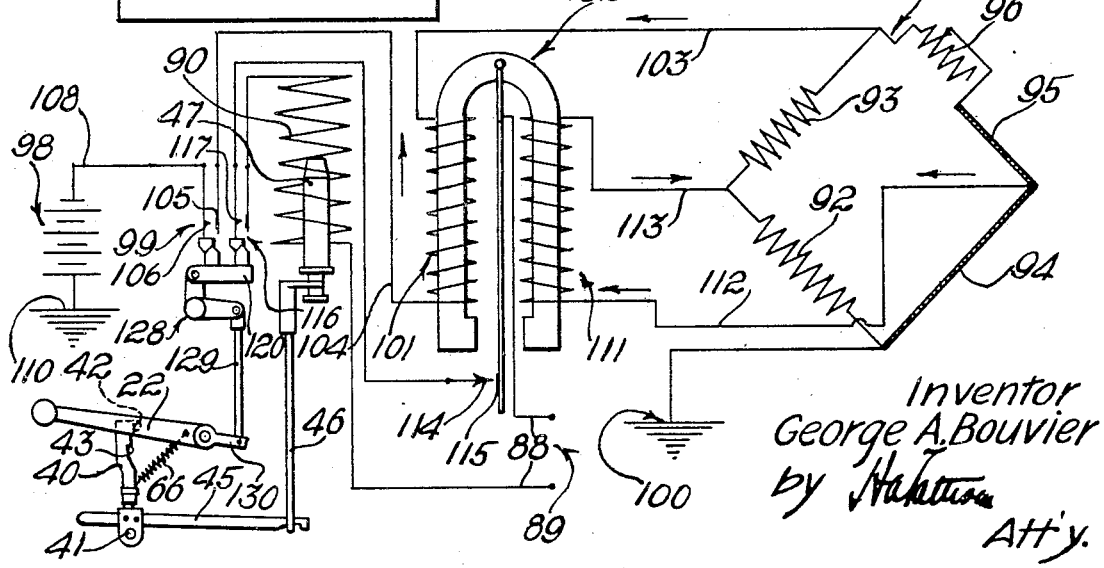
Inventor
George A. Bouvier
by [signature]
Att'y.

Patented Nov. 25, 1930

1,782,403

UNITED STATES PATENT OFFICE

GEORGE ALFRED BOUVIER, OF OAK PARK, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR TESTING ELECTRICAL CONDUCTORS

Application filed November 21, 1925, Serial No. 70,453. Renewed April 17, 1930.

This invention relates to methods of and apparatus for testing electrical conductors, and more particularly to a method of and apparatus for testing a traveling electrical conductor.

The principal objects of the invention are to provide an improved method of and an improved apparatus for accurately testing an electrical conductor during the process of its manufacture.

More specific objects of the invention are to provide an improved method of and an improved apparatus for automatically stopping a machine which is manufacturing an electrical conductor when an imperfect section thereof is produced.

In accordance with the features of the invention, the improved method of testing a traveling electrical conductor consists in continuously defining adjacent sections of the conductor and utilizing the principle of a Wheatstone bridge arrangement for indicating variations in the electrical characteristics between one of said sections and an element including the other section.

The invention is herein disclosed in connection with a serving machine which produces an electrical conductor comprising a textile core covered by superimposed layers of tinsel. The conductor is drawn from a serving mechanism by means of a capstan which also draws the conductor through apparatus having contacting members adapted to engage the conductor continuously and define adjacent predetermined lengths thereof. These adjacent lengths of the conductor form parts of an electrical operating circuit of the apparatus, which circuit embodies the principle of a Wheatstone bridge. Two adjacent arms of the bridge circuit are composed of fixed resistances while the other two arms are composed of resistances formed of the adjacent lengths of the conductor with an adjustable resistance included in one of the resistance arms composed of the conductor. Normally, a potential difference exists across the bridge resulting in current flowing through a winding of a relay connected across the bridge, the magnetic action of which, under normal conditions, opposes and predominates that of a second winding on the relay which is connected to the bridge and tends to close the relay contacts. The relay controls an electrical circuit which includes the winding of a solenoid designed to operate the clutch and brake mechanisms of the serving apparatus.

Other objects and advantages of the invention will become apparent in the following detailed description, reference being had to the accompanying drawings, wherein Fig. 1 is a side elevation, partly in section, of a portion of a serving apparatus embodying the features of the present invention;

Fig. 2 is a detailed section taken on the line 2—2 of Fig. 1;

Fig. 3 is a horizontal section taken approximately on the line 3—3 of Fig. 1;

Fig. 4 is a fragmentary detail view showing a portion of the stop mechanism;

Fig. 5 is an enlarged detail view, partially in section, of a portion of a composite conductor which is particularly adapted to be tested by the improved method and apparatus, and Fig. 6 shows a diagram of an electrical operating circuit embodying the features of the invention.

Referring now to the drawings, and particularly to Fig. 1 thereof, the numeral 10 indicates the supporting framework of the serving mechanism within which a vertically disposed hollow spindle 11 is rotatably mounted in suitable bearings 12 and 13. The spindle 11 is driven from a shaft 15 through gears 16 and 17 secured to the spindle 11 and shaft 15, respectively. The shaft 15 may be operatively connected to and disconnected from a main drive shaft 18 by means of a suitable clutch mechanism 20, the drive shaft 18 being actuated through a gear 19 by an electrical motor or other suitable mechanism (not shown). The clutch mechanism 20 may be of any well known construction and therefore a detailed description thereof is believed to be unnecessary.

The clutch 20 is normally held out of engagement by a compression spring 21 and is actuated by a lever 22 which is fastened intermediate its ends to a shaft 23 rotatably mounted in the frame 10. A tension spring 24 fastened at one end to the lever 22 and secured at its other end to the frame 10 normally holds the clutch lever in a position wherein the clutch is disengaged.

Secured to the spindle 11 so as to be rotatable therewith is a serving head 25 which may be of the type disclosed and claimed in the copending application of G. A. Bouvier, Serial Number 699,441, filed March 15, 1924, and reference may be had to such application for a more detailed description thereof. Carried by the serving head 25 is a guide pulley 26 over which a cotton core 28 is drawn by a capstan 29 from a supply bobbin 30 rotatably supported by the framework 10. The cotton core is guided over a pulley 31 through the hollow spindle 11 and then through an aperture 32 in the serving head 25. The capstan 29 is driven from a vertically disposed shaft 34 through gears 35 and 36 (Fig. 2), the shaft 34 being driven from the shaft 15 through gears 37 and 38 secured to the shafts 15 and 34, respectively.

When the serving mechanism is in operation, the clutch 20 is held in its engaged position against the action of the springs 21 and 24 by a resiliently mounted latch 40 (Fig. 4) which is pivoted at 41 to the frame 10 and is provided with a notched portion 43 adapted to engage a pin 42 secured to the clutch lever 22. The latch 40 is actuated by a solenoid 44 connected in an electrical operating circuit shown in Fig. 6 and hereinafter described. A horizontally disposed bar 45 is secured, at one end, to the latch 40 and operatively connected, at its other end, to a vertically disposed rod 46 which is fastened to a plunger 47 of the solenoid 44. The arrangement is such that when the solenoid is energized and attracts its plunger 47 the latch 40 is disengaged from the pin 42 against the tension of a spring 66, thereby causing the clutch mechanism to be disengaged by the tension spring 24.

Operatively associated with the clutch mechanism 20 is a brake mechanism 48 (Figs. 1 and 3) for stopping the rotation of the serving head 25 when the clutch is disengaged. The brake mechanism 48 as shown more in detail in Fig. 3 comprises a brake drum 49 secured to the spindle 11 and a pair of friction brake members 50 and 51 each of which is pivoted, at one end, to the frame 10 and slidably mounted, at its other end, on a horizontally disposed shaft 52. The brake members are provided with friction surfaces 53 and 54 intermediate their ends which are adapted to engage the brake drum 49. Secured to the shaft 52 between the brake members is a cam 55 having cam surfaces 56 and 57 adapted to engage cooperating cam surfaces 58 and 59 formed on the inner sides of the brake members 50 and 51, respectively. The brake members are normally held in operative engagement with the brake drum by a compression spring 60, one end of which abuts against the end of a housing 61 mounted on the shaft 52 while its other end abuts against the brake member 51. The opposite end of the housing 61 engages the outer side of the brake member 50. Secured to the end of the shaft 52 is a lever 62, the free end of which is pivoted to one end of a rod 63. The other end of the rod 63 is pivotally connected to a lever 64 which is operatively associated with the clutch lever 22, being secured to its shaft 23.

Referring to Figs. 1 and 3, it will be noted that when the clutch lever 22 is moved downwardly, the rod 63 moves upwardly, thereby turning the lever 62, shaft 52 and cam 55 in a counterclockwise direction, looking to the left when viewed in Fig. 3. The cam surfaces 56 and 57 of the cam 55 cooperate with the cam surfaces 58 and 59 to cause the brake members 50 and 51 to be moved away from each other whereby their friction surfaces 53 and 54 are disengaged from the brake drum 49.

Rotatably mounted on the spindle 11 are spools 67 and 68 from which tinsel strands 69 and 70, respectively, are drawn and superimposed on the cotton core 28 in a manner fully described and claimed in the above mentioned copending application. The composite conductor passes through a metal bushing 71, over a guide pulley 72 to an idler roller 73 associated with the capstan 29. The bushing 71 is mounted in a bracket 74 secured to the frame 10 and is designed to constantly engage the moving conductor whereby a ground connection is obtained through the frame 10, which connection is indicated at 100 in the electrical operating circuit shown in Fig. 6.

The roller 73 comprises an idler cap 75 and an idler ring 77 (Fig. 2) which may be composed of brass or other suitable electrical conducting material. The cap 75 and ring 77 are insulated from each other by an idler ring 76 composed of lavite or other suitable nonconducting material. Disposed on the inner side of the ring 77 is a lavite ring 78. The idlers 75, 76, 77 and 78 are secured to each other by screws 79, 79 and are rotatably mounted as a unit on a metal bushing 80, the cap 75 being insulated from the bushing 80 by a lavite washer 81 and a lavite bushing 82. A good electrical connection is secured between the bushing 80 and the idler ring 77 by means of contact springs 83 secured to the bushing 80 and resiliently engaging the inner surface of the ring 77. The bushing 80 is secured to a stud shaft 85 and is insulated therefrom by a fiber sleeve 86. An electrical connection is secured between the shaft 85 and the idler cap 75 by means of a contact spring 87 secured to the shaft 85 and resiliently engaging the inner side of the cap 75.

The idlers 75, 76, 77 and 78 are provided with peripheral grooves which cooperate with similar grooves formed in the periphery of the capstan 29 to guide and retain the composite conductor as it is drawn through the apparatus by the capstan. From the guide pulley 72 the composite conductor is threaded around the idler ring 78, the inner groove of the capstan 29, the idler ring 77, the center groove in the capstan, the idler ring 76, the outer groove in the capstan and the idler cap 75, after which it may be taken up by any suitable mechanism (not shown). The peripheral portion of the capstan is composed of a suitable insulating material, such as lavite (Fig. 2), whereby the composite conductor is insulated from the framework of the machine as it passes around the capstan.

Referring to Fig. 6, it will be noted that the electrical operating circuit comprises a detector circuit which controls an electrical circuit 89 including a winding 90 of the solenoid 44, leads 88 serving to connect the circuit 89 to any suitable source of electrical current (not shown). The detector circuit embodies a Wheatstone bridge arrangement 91 which is composed of fixed resistances 92 and 93 in two of the arms and resistances 94 and 95 formed of the composite conductor in the other two arms with an adjustable resistance 96 included in the arm with the conductor resistance 95. The resistance 94 includes that section of the composite conductor which is disposed between the bushing 71 and the idler ring 77 and the resistance 95 includes that section of the composite conductor which lies between the idler ring 77 and the idler cap 75. The idler cap 75 is electrically connected to the adjustable resistance 96 by a conductor 97 (Figs. 1 and 2) whereby the resistances 95 and 96 are electrically interconnected.

The detector circuit may be energized by current supplied by a battery 98 or other suitable source of electrical current and is controlled by a switch 99 which is actuated by the clutch lever 22 through suitable mechanical linkage hereinafter described. Electrically connected in the detector circuit, in series with the bridge 91 is a winding 101 of a relay 102. One end of the relay winding 101 is connected to the bridge 91 by a conductor 103 and its other end is electrically connected by a conductor 104 to a stationary contact 105 of the switch 99. A movable contact 106 of the switch 99 is connected to one terminal of the battery 98 by means of a conductor 108, the other terminal of the battery being grounded through the framework of the machine as indicated at 110 (Fig. 6).

A second winding 111 of the relay 102 is connected across the bridge 91 by conductors 112 and 113, one end of the conductor 112 being electrically connected to the idler ring 77. The relay 102 is provided with suitable armature contacts 114 and 115 whereby it controls the solenoid circuit 89, which latter circuit is also controlled by a switch 116 actuated simultaneously with the switch 99 by the clutch lever 22. Movable contacts 106 and 117 of the switches 99 and 116 are secured to leaf springs 118 and 119, respectively, and are actuated by a horizontal slide member 120 (Figs. 1 and 6) within which a pair of plungers 121 and 122 are resiliently mounted. The heads of the plungers are formed into suitable cams 123 and 124 which cooperate with cams 125 and 126, formed at the ends of the leaf springs 118 and 119, to open and close the switches 99 and 116 in response to horizontal movements of the slide member 120. The slide 120 is pivotally connected to one end of a bell crank lever 128 pivotally secured to the frame 10. The other end of the bell crank lever 128 is pivoted to one end of a link 129, the other end of which is pivoted to the free end of a lever 130 secured to the clutch lever shaft 23. When the lever 22 is moved downwardly to engage the clutch 20, the link 129 is moved upwardly turning the bell crank lever 128 in a counter-clockwise direction. The slide 120 is thereby moved to the left causing the plungers 121 and 122 to move downwardly and slip past to the opposite sides of the cams 125 and 126 formed at the ends of the leaf springs 118 and 119. The plungers then move upwardly to their original positions due to the action of compression springs individual thereto, causing the contact springs to move to the right and engage the stationary contacts.

In the operation of the above described apparatus, the clutch lever 22 is moved downwardly to engage the clutch 20 and disengage the brake members 50 and 51 from the brake drum 49, thereby starting the capstan 29 and the serving head 25. At the same time the switches 99 and 116 are closed by the downward movement of the clutch lever 22 by means of the mechanical linkage above described. The switch 99 closes the detector circuit which may be traced as follows: from the grounded battery 98, through the bridge 91, then through the relay winding 101 and back to the battery 98 through the switch 99.

The magnetic action of the relay winding 101 normally tends to close the relay contacts 114 and 115 which control the solenoid circuit 89. However, the relative values of the fixed resistances 92, 93 and 96 are such that under normal operating conditions, that is, when the apparatus is producing a conductor having predetermined electrical characteristics, a potential difference exists across the bridge resulting in a current of a predetermined amperage flowing through the relay winding 111 in a direction which is opposite to the direction of the current flowing through the winding 101, as indicated by the arrows (Fig. 6). This produces a magnetic action in the relay winding 111 which opposes and predominates the magnetic action of the relay winding 101 to maintain the relay contacts 114 and 115 open, thereby permitting continuous operation of the apparatus.

When an imperfect section of the conductor is advanced by the apparatus, (a section of the conductor being said to be "imperfect" when one or more of its electrical characteristics varies from a predetermined set standard), or if for any reason a defect occurs in a section of the conductor while it is disposed in the arm 94 or arm 95 of the bridge, it is obvious that the normal unbalanced condition of the bridge network is changed. For instance, assuming that a break of one of the tinsel ribbons occurs in a section of the conductor while it is disposed within the arm 94 of the bridge, it is obvious that the resistance of that arm is increased. Moreover, the arrangement of the bridge network is such that an increase in the resistance of the arm 94 decreases the potential difference existing across the bridge, thereby decreasing the amount of current flowing through the relay winding 111 which obviously weakens its magnetic action or tendency to hold the relay contacts 114 and 115 open. Furthermore, when the resistance of the arm 94 is increased above a certain predetermined value, the magnetic action of the relay winding 111 is weakened sufficiently to cause the magnetic action of the relay winding 101 to predominate to close the relay contacts 114 and 115. The solenoid circuit 89 is thereby closed causing the solenoid 44 to become energized and attract its plunger 47, thereby actuating the clutch and brake mechanisms to stop the serving apparatus, as herein before described.

When the conductor being tested comprises a core 28 having superimposed layers 69 and 70 of tinsel, it is apparent that should either of the tinsel ribbons break as the conductor leaves the serving head 25 of the serving apparatus, the section of the conductor including the break will immediately appear in the arm 94 of the bridge 91, and it will be understood that the resistance of the arm 94 will be increased as the break travels to the end thereof. The electrical unbalance of the bridge network is thereby changed causing the clutch and brake mechanisms to be actuated to stop the serving apparatus in a manner hereinbefore described.

The improved testing apparatus may also be adjusted to prevent the production of a conductor whose conductivity is below a certain predetermined value. This is possible due to the adjustable resistance 96 being included in the arm 95 of the bridge circuit, which arm is composed of a section of the conductor. By this arrangement, it is apparent that a uniform change in the resistance of the conductor in the arms 94 and 95 of the bridge does not change the total resistance of each of those arms in the same ratio since the resistance of a portion 96 of the arm 95 remains constant. The normal unbalanced condition of the bridge is therefore changed resulting in a change in the potential difference existing across the bridge thereby changing the amount of current flowing through the relay winding 111. In the present embodiment of the invention the arrangement is such that when the resistance of the conductor being produced increases above a certain predetermined value in both of the arms 94 and 95 of the detector circuit, the decrease in potential existing across the bridge will be sufficient to cause the magnetic action of the relay winding 101 to predominate to close the relay contacts 114 and 115 whereby the clutch and brake mechanisms are actuated as hereinbefore described.

Although the invention, as herein illustrated and described, is particularly well adapted for use in connection with an apparatus for producing a composite conductor comprising a textile core having superimposed layers of tinsel, it should be understood that the invention is capable of other applications and should be limited only by the scope of the appended claims.

What is claimed is:

1. A method of testing electrical conductors during the process of their manufacture, which consists in indicating variations in conductivity between a predetermined length of a conductor and an element comprising a predetermined resistance and another portion of the conductor.

2. A method of testing electrical conductors during the process of their manufacture for changes in conductivity and defects, which consists in electrically balancing a predetermined length of a conductor with an element including a fixed resistance and a portion of the conductor, and indicating changes in resistance therebetween.

3. A method of testing electrical conductors during the process of their manufacture for changes in conductivity and defects, which consists in electrically balancing a predetermined length of a conductor with an element including a fixed resistance and another portion of the conductor, subjecting said conductor length and element to a predetermined electrical current, and indicating variations in resistance between the conductor length and said element.

4. In an apparatus for testing an electrical conductor, a plurality of contacting members for defining adjacent sections of the conductor of predetermined length, means for maintaining a continuous relative movement between the conductor and said contacting members, and means for indicating variations in an electrical characteristic between one section of the conductor and an element including another section of said conductor.

5. In an apparatus for testing an electrical conductor, a plurality of contacting members designed to define sections of a conductor of predetermined length, means for maintaining a continuous relative movement between the conductor and said contacting members, means for comparing the resistance of one section of the conductor with the resistance of an element including another section of the conductor, and means for indicating variations in the resistance therebetween.

6. In an apparatus for testing an electrical conductor during the process of its manufacture, a plurality of contacting members designed to define predetermined sections of the conductor, means for causing a relative movement between the conductor and said contacting members, and a Wheatstone bridge having one arm composed of a section of the conductor and another arm composed of a resistance including a portion of the conductor.

7. In an apparatus for testing an electrical conductor during the process of its manufacture, a plurality of contacting members for defining predetermined lengths of the conductor, means for causing a relative movement between the conductor and said contacting members, a Wheatstone bridge having one arm composed of a section of the conductor and another arm composed of an element including a portion of the conductor, and means responsive to variations in an electrical characteristic of said arms.

8. In an electrical control system, an electrical circuit for testing a conductor for changes in conductivity and defects, including a Wheatstone bridge, one arm of the bridge being composed of a section of the conductor, another arm of the bridge being composed of an element including a portion of the conductor, and means responsive to variations in an electrical characteristic of said arms.

9. In an apparatus for testing an electrical conductor during the process of its manufacture, a plurality of contacting members adapted to define predetermined sections of the conductor, means including an electrical operating circuit for causing a relative movement between the conductor and said contacting members, a Wheatstone bridge included in said operating circuit, one arm of the bridge being composed of a section of the conductor, another arm of the bridge comprising the combined resistance of another section of the conductor and a fixed resistance, and means responsive to variations in the resistance of said arms.

10. In an electrical control system, an electrically operated means, an electrical circuit for testing a conductor for changes in conductivity and defects and for controlling said means, including a Wheatstone bridge, said bridge comprising two fixed resistances and two resistances composed of the conductor, an adjustable resistance included with one of the conductor resistances, a relay having two windings, the magnetic actions of which oppose each other, one winding being connected in series with the bridge, the other winding being connected across the bridge, a source of electrical energy for connecting an electrical current to the bridge, a portion of said current normally passing through the relay winding connected across the bridge, whereby its magnetic action normally predominates to control the operation of the relay for controlling said electrically operated means, and means responsive to variations in an electrical characteristic of the electrical conductor included in the bridge for varying the amount of current passing across the bridge.

11. In an electrical control system, an electrically operated means, an electrical circuit for testing a conductor for changes in conductivity and defects and for controlling said means, including a Wheatstone bridge, said bridge comprising two fixed resistances and two resistances composed of the conductor, an adjustable resistance included with one of the conductor resistances, a relay having two windings, the magnetic actions of which oppose each other, one winding being connected in series with the bridge, the other winding being connected across the bridge, a source of electrical energy for connecting an electrical current to the bridge, a portion of said current normally passing through the relay winding connected across the bridge whereby its magentic action normally predominates to hold the relay contacts open to cause a continuous operation of said electrically operated means, and means responsive to a predetermined decrease in the resistance of the conductor included in the bridge for decreasing the magnetic action of the relay winding connected across the bridge to cause the opposing relay winding to predominate and close the relay contacts to render said electrically operated means ineffective.

12. In an apparatus for testing an electrical conductor, an electrical circuit including a Wheatstone bridge, said bridge having an arm including an adjustable resistance and a constantly changing section of the conductor, and contact members maintaining continuous electrical connection between said sections and the rest of the bridge.

13. In an apparatus for testing an electrical conductor during the process of its manufacture, an electrical circuit including a Wheatstone bridge, said bridge having an arm including an adjustable resistance and a section of the conductor, and a relay having a winding connected in circuit with the bridge and a winding connected across the bridge.

14. In an apparatus for testing an electrical conductor during the process of its manufacture, a plurality of contacting members engaging said conductor for defining two lengths of conductor differing in resistance, means for rotating said contacting members in accordance with the advancement of the conductor, and a Wheatstone bridge having one arm composed of one of said lengths of conductor and another arm composed of a resistance and the other length of said conductor.

15. In an apparatus for testing an electrical conductor during its process of manufacture, an electrical circuit including a Wheatstone bridge, said bridge having an arm including an adjustable resistance and a section of the conductor, and a two winding relay having one of its windings connected in circuit with the bridge to respond to a normal difference of potential existing across the bridge and the other winding connected thereto to respond to a change in the difference of potential.

16. In an apparatus for testing an electrical conductor, means for continuously advancing the conductor, means for defining ever-changing sections of the conductor of constant length, and means for indicating variations in an electrical characteristic between one section of the conductor and an element including another section of the conductor.

17. In an apparatus for testing an electrical conductor, a plurality of contact members positioned in disaligned relation and designed to define ever-changing sections of the conductor of predetermined length, means for continuously advancing the conductor relative to the contact members, means for comparing the conductivity of one section of the conductor with the conductivity of an element including another section of the conductor, and means for indicating variations in the conductivity therebetween.

In witness whereof, I hereunto subscribe my name this 3rd day of November, A. D. 1925.

GEORGE ALFRED BOUVIER.